United States Patent [19]

Bemrose

[11] 4,110,916
[45] Sep. 5, 1978

[54] FORCED AIR FOOD DRIER

[76] Inventor: Harold E. Bemrose, 423 E. Alder, Walla Walla, Wash. 99362

[21] Appl. No.: 718,910

[22] Filed: Aug. 30, 1976

[51] Int. Cl.$^2$ ............................................. A23B 4/04
[52] U.S. Cl. ..................................... 34/197; 99/483; 99/476
[58] Field of Search ................................. 99/467–468, 99/473–481, 483; 34/48, 53, 104, 197, 199, 192, 195, 211, 233; 219/386, 400, 408, 413; 312/236

[56] References Cited

U.S. PATENT DOCUMENTS

| | | | |
|---|---|---|---|
| 104,333 | 6/1970 | Mickel | 34/195 |
| 1,353,358 | 9/1920 | Lindholm | 34/199 |
| 1,535,465 | 4/1925 | Hackman | 34/199 |
| 2,480,227 | 8/1949 | Derr | 34/104 |
| 3,817,166 | 6/1974 | McLain | 99/482 |
| 3,839,622 | 10/1974 | Mastin | 219/400 |
| 3,943,842 | 3/1976 | Bills | 99/473 |
| 3,955,488 | 5/1976 | Wheeler | 99/467 |
| 4,010,341 | 3/1977 | Ishammar | 219/400 |

FOREIGN PATENT DOCUMENTS 577,916  9/1924  France .................................. 34/199

Primary Examiner—Harvey C. Hornsby
Assistant Examiner—Robert Pous
Attorney, Agent, or Firm—Clarence A. O'Brien; Harvey B. Jacobson

[57] ABSTRACT

A forced air food drier having a cabinet-like structure with a front door for access to the interior of said cabinet and drawer supports arranged along each side of said cabinet for receiving a plurality of drawers thereon. Each drawer is provided with a reflective bottom member and spaced a small distance thereabove a screen member for supporting the food to be dried thereupon. One end of each drawer is provided with an air passage slot and when the drawers are assembled within the cabinet, the air passage slots are alternated at the sides of the cabinet so that forced hot air from a blower structure and heating structure at the bottom of the cabinet is forced to pass alternately by the bottoms and tops of each respective drawer until exhausted out exhaust vents at the top of the cabinet. Appropriate fan and blower control timers together with heater control switches and timers are provided with the cabinet structure.

9 Claims, 5 Drawing Figures

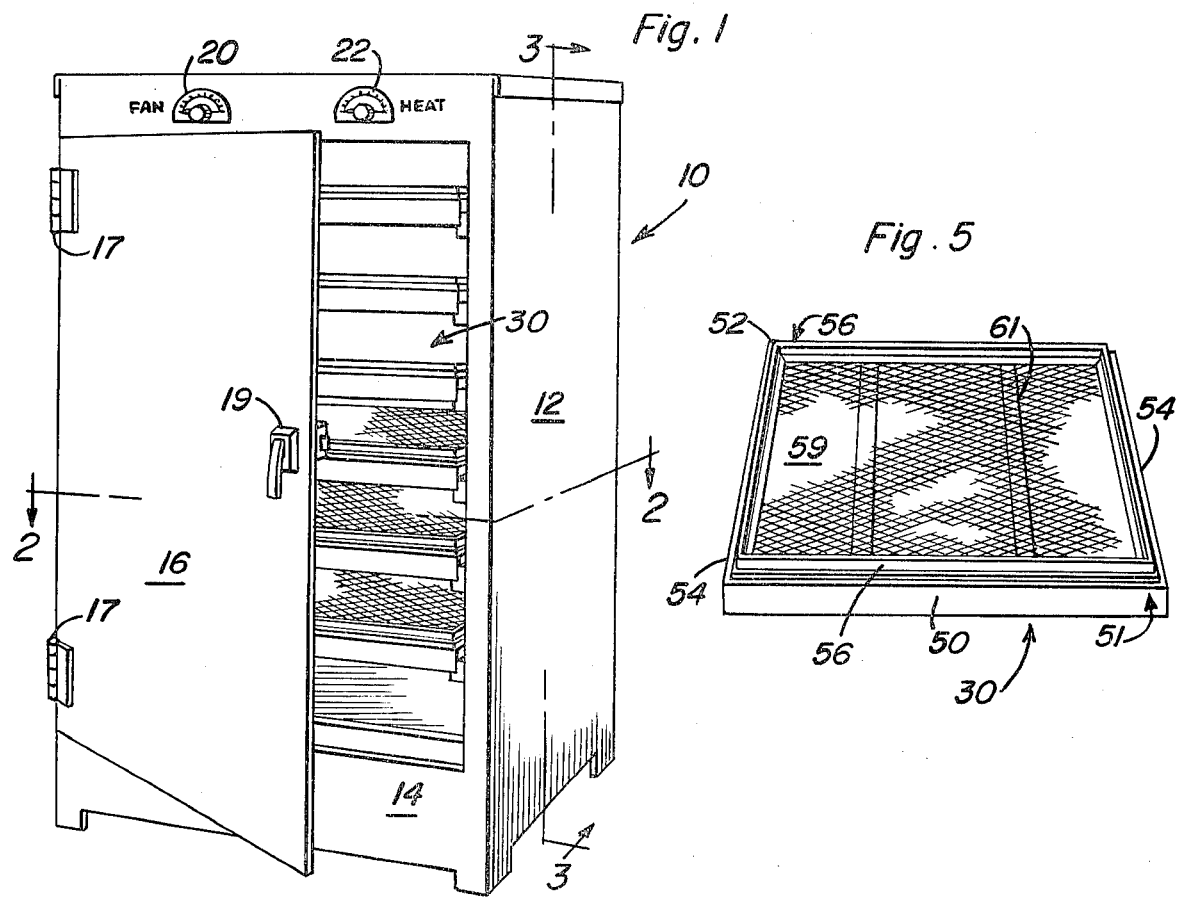
Fig. 1
Fig. 5
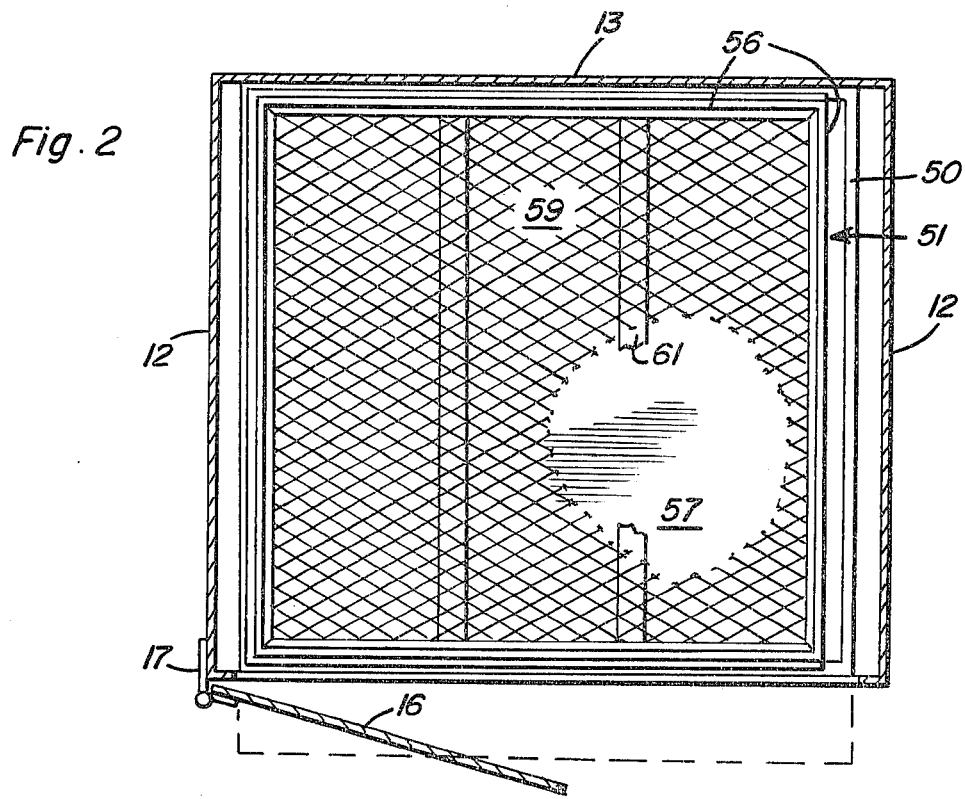
Fig. 2

FORCED AIR FOOD DRIER

BACKGROUND OF THE INVENTION

1. Field of the Invention

This invention relates generally to forced air driers for food such as fruit and the like. Heated air is forced to pass by the food being supported by drawers having screens and reflector structure so that the food is heated from all sides simultaneously.

2. Description of the Prior Art

A common problem with known type driers is that the heated air passes by convection rather than being forced by blowers. This will dry food but will involve a considerable period of time to do so.

Another problem with known type devices is that the food is not uniformly heated and exposed to the drying air on all sides of same, but the heating air and drying air only has excess to the food along some of the sides thereof and the side resting upon the food holder is prevented from being properly dried.

Another problem with known type food driers is that they do not provide special provision for heating the side of the food being supported by the drier structure.

Another problem with known type devices is that they involve the use of steam which has inherent problems and dangers associated therewith.

Another problem with known type devices is that they are complicated and awkward to use. Many of them do not provide any provision for variation of the flow path of the heated air used for the drying of the food, and also do not offer flexibility as to the number of units which may be exposed to the heated air at one time.

Known prior art patents which may be pertinent to this invention are as follows:

U.S. Pat. No. 183,630; W. Braidwood; Oct. 24, 1876.
U.S. Pat. No. 253,257; J. O. Beazley; Feb. 7, 1882.
U.S. Pat. No. 535,662; A. H. Blackburn; Mar. 12, 1895.
U.S. Pat. No. 640,936; T. F. Parsons; Jan. 9, 1900.
U.S. Pat. No. 2,357,946; E. I. Fuller; Sept. 12, 1944.

None of these prior art devices offers the new and unique features of the invention disclosed herein.

SUMMARY OF THE INVENTION

An object of the present invention is to provide a forced air food drier which will expose the food to be dried to heated air on all sides of same simultaneously. A screen structure is used to support the food being dried and additional reflector means is provided to increase the heat, especially the radiant heat on this side of the food.

Another object of the present invention is to provide a food drier which is quite flexible in arrangement wherein removable drawers are provided in an overall cabinet structure with at least one end of each drawer being provided with an air passage slot therethrough. This permits the drawers to be arranged in the cabinet so that the heated air which is forced from the bottom of the cabinet upwardly through the cabinet will have to traverse the drawers and the food to be dried as supported thereon back and forth in a traverse manner.

A further object of this invention is to provide a device having at least one blower structure, and preferably two of same, together with heater elements of the multiple electrical type for providing the heated air which is forced to pass by the food supported by the drawer structure before the air is exhausted out the top of the device.

A still further object of this invention is to provide a forced air food drier having a support cabinet with access door on one side thereof and appropriate drawer structure mounted upon supporting projections with the cabinet structure for easy removable, replacement, and arrangement of air passageways within said cabinet. Appropriate blower and heating structure is provided together with blower control and timer mechanism, and heater control and timer mechanism.

A still further object of this invention is to provide removable drawer structure for a forced air food drier which basically has two parts with one bottom portion having a reflector bottom which upon being heated will radiate heat against the adjacent side of food supported upon the second section which consists of a frame slightly smaller than and removably mountable within the frame of the first section and containing a screen support structure for holding the food to be dried thereupon. An air slot is provided between the reflector member and one end of the frame of the bottom drawer portion.

An important feature of the forced air food drier of this invention is in the fact that the food to be dried is placed upon removable drawers mounted upon cabinet support members for ease of variation of the path of drying air past said food. Each drawer is provided with a reflective base structure and a removable frame support structure having a screen therein for directly supporting the food to be dried. An air slot at one end of each drawer permits the heated forced air to pass through said end of the drawer. Because of the reflective material on the bottom portion of each drawer, the food to be dried is exposed to heat from all sides thereof which will evenly and rapidly heat same. This is far more efficient than known type devices which only heat the food from several sides thereof after which the support structure or the food thereon must be moved or rotated in order to properly air dry the food.

Basically a refrigerator type cabinet having a large access door along the front thereof is provided with lower end heating structure mounted in the base thereof together with an appropriate air intake slot with cover screen thereon for inducting cool outside air into the structure for heating and forced feed of same throughout the interior of the cabinet as determined by the arrangement of removable drawere. Each drawer has an air passage slot at one end thereof and is preferably arranged within the cabinet so that the heated forced air must traverse through the cabinet past one drawer then over the top of same back toward the other side of the cabinet through the air slot of the next drawer thereabove, then back to the other side of the cabinet, etc. until the forced air is exhausted at the top of the cabinet by appropriate vent slots which also are covered by screen material to prevent the entry of bugs, insects and the like during period of non-use of the device. Appropriate blower and fan control switch structure together with timing mechanisms are provided preferably at the top of the cabinet for easy access by a user of the device. Also heater control switch and timer structure are provided for the single or multiple electrical heating elements as provided in the base of the cabinet.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the forced air food drier of this invention.

FIG. 2 is a top plan view, partly in cross section, taken generally along line 2—2 of FIG. 1.

FIG. 5 is a perspective view of the drawer structure per se.

DESCRIPTION OF THE PREFERRED EMBODIMENT

Figure 4:
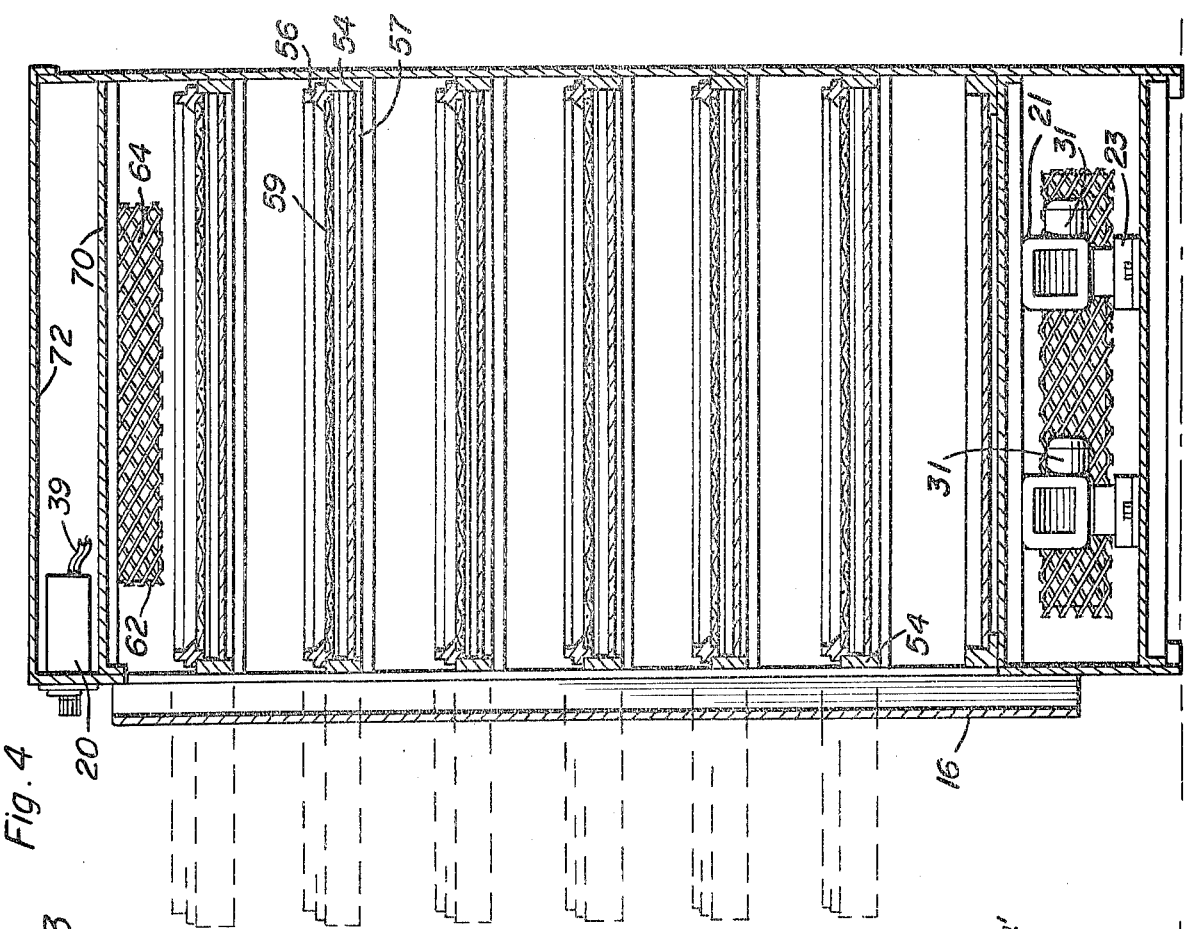
FIG. 4 is a side elevational view, partly in cross section, taken generally along line 4—4 of FIG. 3.

Referring to FIG. 1 of the drawings, reference numeral 10 indicates in general the forced air food drier of this invention with the access door slightly ajar and the removable drawer structure as normally provided therein clearly visible. Also the the fan control mechanism and heat control structure is shown at the top of same. As shown, a refrigerator type support cabinet of vertical height greater than the width and depth consists of sidewalls 12, backwall 13, front panel 14, and openable door 16. The door 16 is appropriately supported by hinges 17 and a refrigerator type latch 19 is also provided. The removable drawer structure for supporting the food to be dried in the new and unique manner as disclosed further on herein is indicated by reference numeral 30.

Figure 3:
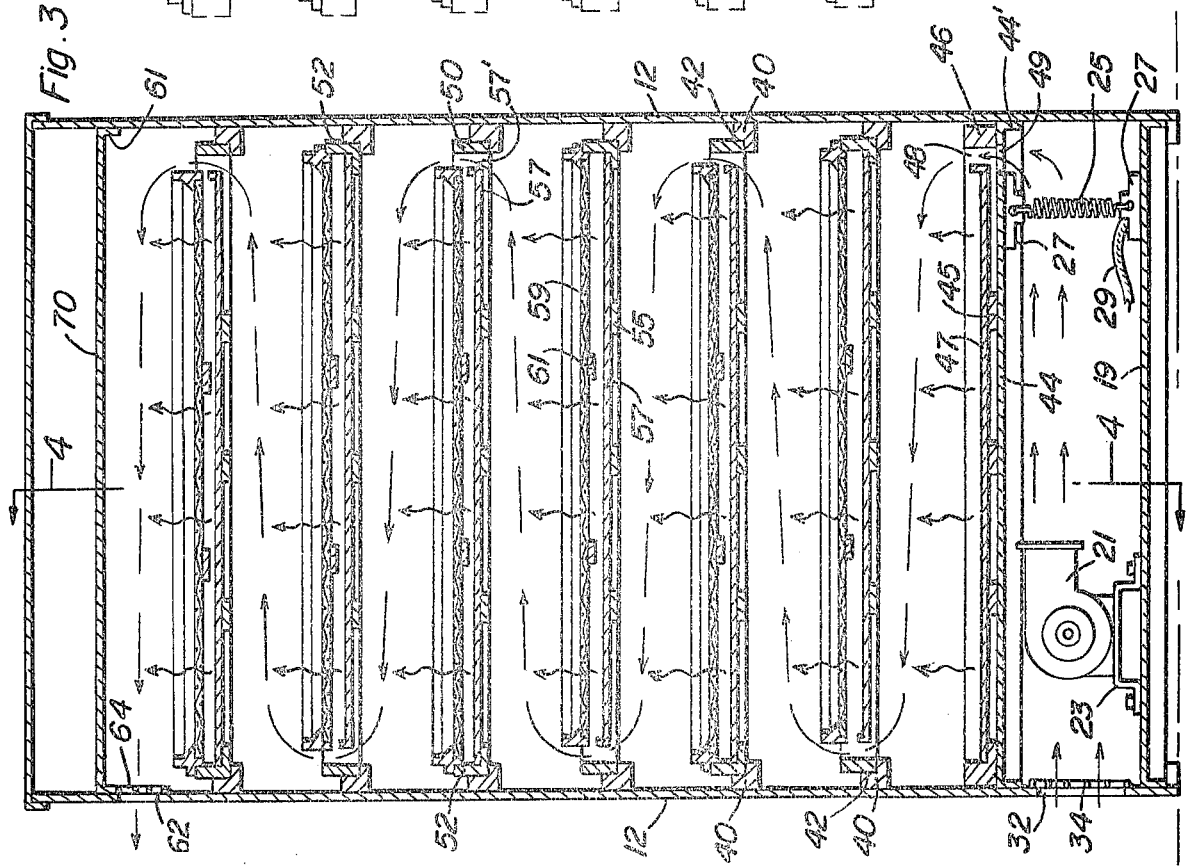
FIG. 3 is a front elevational view, partly in cross section, taken generally along line 3—3 of FIG. 1.

Looking at FIG. 3 which is a cross section through the middle of the device looking toward the rear thereof, the two parallel side walls 12 of the cabinet are shown as supporting the runners or drawer support members 40. These members 40 are appropriately fastened to the interior of the walls 12 and have a guide recess portion 42 facing inwardly and upwardly of the cabinet for supporting the drawers thereupon. At the very base of the cabinet is a separating partition 44 having flanged ends 44' attached to the interior of said cabinet. The partition member 44 completely separates the very bottom of the cabinet from the upper interior thereof except for an air flow slot 49 provided at the right side thereof. The compartment formed by the cabinet floor 19, and the walls of the cabinet has an opening 32 provided in the left wall 12 which is appropriately converted with screen or grille material 34. Air is inducted through this opening by means of the blower structure 21 having a motor drive therefor 31. Appropriate support structure 23 positively retains the blower unit in place on the bottom wall 19. Generally two such units will be provided for flexibility of control and operation. Squirrel cage type blower units as used with photographic type drier units, and furnace hot air type units have been found to be quite satisfactory. While a single fan or blower unit may be used, it is preferable if at least two such structures are provided for proper air flow through the interior of the cabinet.

A fan control on-off switch structure together with timer mechanism 20 is mounted, preferably at the top of the cabinet for easy access by a user of the device, and appropriately connected by electric cable 39 and a source of power, not shown, to the motors 31 of the blower units. Insulating support structure 27 is provided mounted on the floor 19 and the partition wall 44 for supporting at least one electric heating element 25, and again preferably a multiplicity of same. An appropriate heater control 22 is mounted at the top of the cabinet near the fan mechanism. This control 22 will include an on-off switch together with timer structure for determining and setting the length of time which the heater will remain on. Also, if multiple heater units are installed a multiple switch for turning on one or all of the units selectively may be used.

Still looking at FIG. 3, the partition member 44 supports a frame structure 46, slats 45, and reflector member 47. Normally, this reflector member will be heated and emit radiation type heat waves over an extended period of time. Also, generally no food will be placed directly over this bottom reflector member. All of the drawers above this member are removable and of the double layer construction type to be described next.

The new and unique drawer on tray structure of this invention is shown separately and in perspective in FIG. 5. The drawer structure consists of two portions, a bottom frame portion made up of members 50 and 52 connected together by members 54. Slats 55 are provided between the connecting members 54. Upon the slats 55 is permanently fastened and provided reflecting sheet material 57. One end of the sheet material contacts and forms a tight engagement with the frame member 52 while the other end of the sheet material has an upturned flange 57' thereon and is spaced and separated from the frame member 50 in order to provide an air space between same. Thus as can be readily visualized, the reflecting sheet completely closes the frame structure 50, 52, and 54, except for the gap between the frame member 50 and the flange 57' at the end of the reflector sheet 57. The second portion of the drawer structure comprises an overall 4-sided frame 56 having slats 61 between the sides of said frame and supporting a screen material 59 therefrom. This second upper frame structure sets into and is retained by the bottom frame structure already described.

Thus, as can be readily visualized by looking at the drawings, when food to be dried is placed within the upper frame structure and resting upon the screen material 59, there will be a gap between the screen and the bottom of said food and the reflector sheet 57. It is this feature which enables the food to be dried on all sides thereof simultaneously. The reflector sheet 57 may be made of any adequate reflective material. Normally, metal material such as steel or aluminum will be used. The overall structure may be constructed of wood, plastic or other synthetic materials, or, of course, metal, aluminum or steel.

With this arrangement of two-piece drawer structure which as a unit is removable and adjustable within the overall cabinet, the device offers flexibility and adjustability not normally achieved in a device of this type. The 2-part drawer structure allows removing of the food support portion for cleansing of the screen and also cleaning and polishing of the reflective portion in the lower bottom of the drawer. Depending upon how the drawers are inserted into the cabinet and as supported by the support members 40, the flow of the heated forced air can be varied as desired by the user of the device. The flow arrows in FIG. 3 depicts what is normally the preferred manner of air flow and arrangement of drawer structure, and also indicates the reflective radiant heat from the solid reflective bottoms of the respective drawers.

At the top of the cabinet structure, a partition 70 divides the very top of the cabinet 72 from the upper shelf member or drawer. It is within this compartment defined by partition 70 and top 72 that the controls 20 and 22 are normally provided. An exhaust vent comprising an opening 62 and appropriate screening or grille work 64 is normally mounted at the top of the cabinet just below partition 70 on at least one of the cabinet walls and if desired both walls thereof. As shown in FIG. 3, just one aperture 62 is provided and this is in the same wall as the induction aperture 32 at the bottom of the same wall.

The air intake opening 32 shown in the drawing is intended to permit fresh air to enter the cabinet. The air exhaust vent 62, on the other hand, is intended to facilitate the removal of spent air once it reaches the top of the drier.

There may be more than one air exhaust vent per side as well as more than one air intake opening. Also, such vents may be provided on both sides of the cabinet, if desired.

These vents and openings are preferably constructed to be adjustable so they can ramain fully opened, fully closed, or anywhere between. These vents, when adjustable, are used as additional heat and humidity controls. Any conventional adjustable vent structure may be used, such as a sliding panel, with or without slots therein, or closable hinged panels may be used with adjusting rods for holding the panels partially or fully open.

From looking at the various Figures, one can readily visualize how quickly and efficiently food placed upon the respective screen units of the various drawers will be heated by the forced hot air passing thereover in addition to the heat received from the reflective surface of the bottom of the respective drawers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents amy be resorted to, falling within the scope of the invention.

What is claimed as new is as follows:

1. A forced air drier for food such as fruits and the like, said drier comprising a cabinet having a top, a bottom and side wall means extending between said top and bottom and defining an access opening in one side of said cabinet, a door removably closing said access opening, support means within said cabinet for removably supporting vertically spaced food supporting tray structures, a plurality of tray structures removably supported in relative vertically spaced relation from said support means within said cabinet, each of said tray structures including a pair of vertically spaced upper and lower food support and radiant heat sheets, respectively, said food support sheets being foraminous, alternating opposite sides of said vertically spaced tray structures including means defining upstanding air flow passages therethrough communicating the spaces between adjacent pairs of tray structures and into which the adjacent portions of the spaces between pairs of upper and lower sheets open, said spaces between adjacent tray structures, said spaces between upper and lower sheets, and said passages defining a tortuous air passage through said cabinet around said tray structures, and means operative to force heated air through said tortuous passage in said cabinet.

2. The combination of claim 1 wherein said tray structures comprise draw-type structures removable from said support means through said access opening.

3. The combination of claim 1 wherein each of said tray structures includes an open peripheral frame, a plurality of support members supported from and extending between opposite sides of said frames, said radiant heat sheets being received within the corresponding frames and supported from the support members thereof, said foraminous sheet being removably supported from said frames in vertically spaced relation relative to the corresponding radiant heat sheets.

4. The combination of claim 3 wherein said air flow passages extend through said tray structures inwardly of the corresponding sides of the frames thereof.

5. The structure as set forth in claim 1, wherein the means for forcing heated air through the cabinet includes at least one blower fan with motor, and control timer means connected to said blower motor and mounted for easy operation thereof externally of the cabinet.

6. The structure as set forth in claim 5, together with heater means associated with the blower fan for heating the forced air to a desired drying temperature, and a heater control for the heater means mounted for easy operation externally of the cabinet.

7. The structure as set forth in claim 6, wherein two blower fans are provided with motors therefor, and both blower motors are operated selectively from the single control mechanism.

8. The structure as set forth in claim 7, wherein double heaters are provided, operable selectively from the single heater control mechanism.

9. The structure as set forth in claim 8, wherein the cabinet is provided with an air intake along one bottom wall adjacent the blower fan structure mounted internally of said cabinet, and an exhaust opening is provided along at least one top wall of the cabinet.

* * * * *